United States Patent
Sollars

[19]

[11] Patent Number: 6,067,601
[45] Date of Patent: May 23, 2000

[54] CACHE MEMORY BASED INSTRUCTION EXECUTION

[75] Inventor: Donald L. Sollars, Milpitas, Calif.

[73] Assignee: Brecis Communications, San Jose, Calif.

[21] Appl. No.: 08/963,389

[22] Filed: Nov. 3, 1997

[51] Int. Cl.[7] .................................................. G06F 12/00
[52] U.S. Cl. ........................ 711/131; 711/145; 711/147; 711/149; 711/156
[58] Field of Search ...................... 711/131, 141, 711/123, 130, 133, 129, 145, 147, 149, 156; 712/238, 41

[56] References Cited

U.S. PATENT DOCUMENTS

| | | |
|---|---|---|
| 4,525,780 | 6/1985 | Bratt et al. . |
| 4,959,777 | 9/1990 | Holman, Jr. ............................. 711/141 |
| 5,185,878 | 2/1993 | Baror et al. ............................. 711/123 |
| 5,228,135 | 7/1993 | Ikumi ..................................... 711/131 |
| 5,287,490 | 2/1994 | Sites . |
| 5,404,469 | 4/1995 | Chung et al. . |
| 5,430,862 | 7/1995 | Smith et al. . |
| 5,438,668 | 8/1995 | Coon et al. . |
| 5,568,401 | 10/1996 | Narayanaswami . |
| 5,574,873 | 11/1996 | Davidian . |
| 5,574,927 | 11/1996 | Scantlin . |
| 5,701,432 | 12/1997 | Wong et al. ............................. 711/130 |
| 5,742,802 | 4/1998 | Harter et al. . |
| 5,774,710 | 6/1998 | Chung .................................... 712/238 |
| 5,787,478 | 7/1998 | Hicks et al. ............................. 711/141 |
| 5,893,147 | 4/1999 | Deng ..................................... 711/130 |
| 5,909,695 | 6/1999 | Wong et al. ............................. 711/133 |
| 5,940,626 | 8/1999 | Sollars ..................................... 712/41 |
| 5,946,710 | 8/1999 | Bauman et al. ......................... 711/129 |

OTHER PUBLICATIONS

*Computer Architecture and Quantitative Approach*; Authors: John L. Hennessy, David A. Patterson; Morgan Kaufmann Publishers, Inc., 1990, Chapter 3, entitled "Instruction Set Design: Alternatives and Principles", pp. 89–137.

*Computer Architecture and Quantitative Approach*; Authors: John L. Hennessy, David A. Patterson; Morgan Kaufmann Publishers, Inc., 1990, Chapter 5, entitled "Basic Processor Implementation Techniques", pp. 199–248.

*Primary Examiner*—John W. Cabeca
*Assistant Examiner*—Fred F. Tzeng
*Attorney, Agent, or Firm*—Blakely, Sokoloff, Taylor & Zafman, LLP

[57] ABSTRACT

An apparatus employing a cache memory based approach to instruction execution includes a cache memory and one or more control units. The control units operate the cache memory to directly supply appropriate ones of a plurality of values stored in selected ones of said cache locations for a plurality of variables to one or more arithmetic logic units (ALU) as inputs to arithmetic/logic operations, and/or to directly accept and store results of arithmetic logic operations from the one or more ALU as values of the variables in selected ones of said cache locations. The direct supplying and the direct accepting and storing are performed responsive to instructions specifying said arithmetic/logic operations and logically designating the variables associated with the specified arithmetic/logic operations.

49 Claims, 2 Drawing Sheets

CACHE MEMORY BASED INSTRUCTION EXECUTION

BACKGROUND OF THE INVENTION

1. Field of the Invention

The present invention relates to the field of processors. More specifically, the present invention relates to the art of instruction execution practiced on processors.

2. Background Information

Prior art approaches to instruction execution practiced by processors can be broadly classified into three approaches based on the manner operand storage is handled. Broadly defined, the three approaches are stack based approach, accumulator based approach and register based approach. Stack, accumulator and registers are different functional forms of temporary storage medium employed in processor datapaths, which in addition to the temporary storage medium, includes arithmetic logic units (ALU) and so forth. Register is characterized by their symbolic designations through register identifiers, i.e. R1, R2 and so forth. The term processor as used herein in the present specification is intended to include micro-controllers (MCU), digital signal processors (DSP), general purpose microprocessors (uP), and the like, whereas the term instruction as used herein is intended to include macro-instructions visible to programmers or compiler writers as well as micro-instructions, micro-operations, or primitive operations and the like that are not visible to programmers and compiler writers.

In the case of the stack based approach, one of the source as well as the destination operands of an instruction are implicitly defined to be located at the top of the stack, whereas, in the case of the accumulator based approach, one of the source as well as the destination operand of an instruction are implicitly defined to be located in the accumulator. Typically, the other source operand is located in a register. In the case of the register set based approach, the source and the destination operands of an instruction are either located in registers or in memory locations. While registers are specified by their identifiers, memory locations, whether cached or not, are specified by either physical or virtual addresses, depending on the manner in which memory is managed.

While the stack based approach enjoys the advantage of providing a simple model for expression evaluation, and short instruction, the approach suffers from at least the disadvantages of forcing all the operands onto the stack, and yet not being able to randomly access the pushed down operands in the stack, resulting in inefficient coding. As to the accumulator approach, while it minimizes the internal states of a processor, and provides for short instructions, it also suffers from at least the disadvantage of very high memory traffic, since the accumulator is the only temporary storage. The register based approach has the advantage of being the most general model for code generation, however, because of the access and related circuitry required to support a register, most prior art register based processors tend to provide only a limited number of registers, resulting in a relatively small working set. The disadvantage becomes especially limiting for heavily pipelined super-scalar processors.

Thus, a more efficient and effective approach to instruction execution without some of the disadvantages of the prior art approaches is desired.

SUMMARY OF THE INVENTION

An apparatus, such as a processor, a system embedded with a processor, and the like, employing a cache memory based approach to instruction execution is disclosed. The apparatus includes a cache memory having a plurality of cache lines of cache locations, and one or more control units. The one or more control units operate the cache memory to directly supply appropriate ones of a number of values stored in selected ones of the cache locations for a number of variables to one or more ALU as inputs to arithmetic/logic operations, and/or to directly accept and store results of arithmetic/logic operations from the one or more ALU as values of the variables in selected ones of the cache locations. The direct supplying as well as the direct accepting and storing are performed responsive to instructions specifying the arithmetic/logic operations and logically designating the variables associated with the specified arithmetic/logic operations.

In one embodiment, the one or more control units operate to map logical variable designations of the instructions to physical/virtual addresses of the variables and/or cache addresses to either content address or positionally access the cache memory to facilitate the direct supply of stored variable values and the direct acceptance and storing of results of arithmetic/logic operations. The one or more control units further operate to maintain logical variable designation to address mappings, creating and updating logical variable designation to address mappings responsive to instructions logically defining variables and specifying physical/virtual addresses of the variables being defined. The physical/virtual addresses may be explicitly as well implicitly specified in terms of an arithmetic expression of one or more logically designated variables. The arithmetic expression may employ the physical/virtual address of at least one of the one or more logically designated variables, symbolically specified.

In one embodiment, the specified arithmetic/logic operation may employ the physical/virtual address of a logically designated variable, symbolically specified. The one or more control units further operate the cache memory to directly execute assignment instructions logically designating the variables associated with the assignments. The assignment instructions may include employment of the physical/virtual address of at least one of the logically designated variable, symbolically specified.

In one embodiment, the variables include control variables of the apparatus, which include the above described mapping information. The one or more control units operate the cache memory to allocate the various cache lines to store values of variables with physical/virtual addresses of a number of memory pages, with a first of the memory pages being reserved for the control variables of the apparatus. The various memory pages are organized into an hierarchy of logical units of at least two levels.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. Those skilled in the art will also appreciate that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Figure 1:
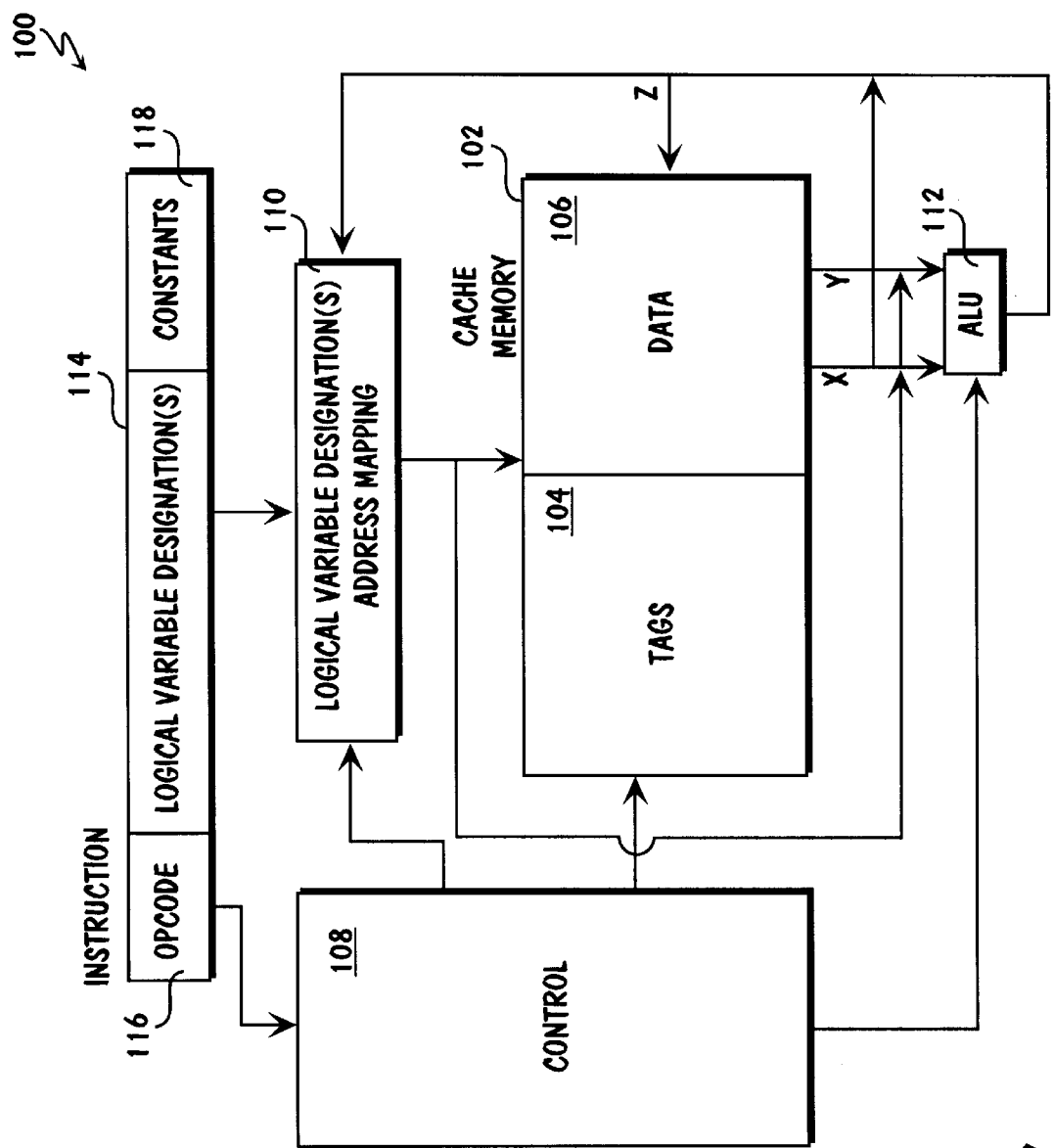
FIG. 1 illustrates an exemplary processor incorporated with the teachings of the present invention.

Referring now to FIG. 1, wherein one embodiment of an exemplary processor incorporated with the teachings of the present invention is shown. As shown, exemplary processor 100 includes cache memory 102 having tag array 104 and data array 106. Data array 106 includes a number of data lines of cache locations for storing values of variables, whereas tag array 104 includes a number of corresponding tag entries for storing address tags for the variables whose values are stored in the corresponding data lines. Each of the tag entries also includes a number of control bits. In particular, each tag entry includes a control bit for denoting the corresponding data line is to be "locked down" for positional access, i.e. by cache address, as opposed to being accessed through content address using the physical/virtual address of a variable. Positional access has a shorter access latency than content address access. Together, the tag entries and the corresponding data lines form the cache lines. The address tags are associated with either the physical or virtual addresses of the memory locations where the variables are stored, depending on the memory management model, i.e. physical or virtual. Cache memory 102 may be content addressed using the physical/virtual addresses associated with the variable or positionally accessed using cache addresses of the cache locations. For the illustrated embodiment, cache memory 102 includes two read ports (X and Y) and one write port (Z). The outputs on read ports X and Y may be by-passed to write port Z. Except for the teachings of the present invention incorporated in cache memory 102, which will be described in more detail below, cache memory 102 is intended to represent a broad category of cache memory known in the art.

Exemplary processor 100 further includes control unit 108, mapping unit 110 and arithmetic logic unit 112, coupled to cache memory 102 and each other as shown. In particular, output of mapping unit 110 may be by-passed to ALU 112. ALU 112 is intended to represent a broad category of ALU known in the art. Except for the teachings of the present invention incorporated into control unit 108 and mapping unit 110, which are further described below, control unit 108 and mapping unit 110 are also intended to represent a broad category of these elements known in the art. Notwithstanding these teachings to be incorporated, as will be apparent from the description to follow, control unit 108 and mapping unit 110 may nevertheless be implemented in hardware or firmware or combination thereof, employing any number of circuitry and/or programming techniques known in the art.

In accordance with the present invention, control and mapping units 108 and 110 together operate cache memory 102 to directly supply appropriate ones of a number of values stored in selected ones of the cache locations for a number of variables to ALU 112 as inputs to arithmetic/logic operations, and/or to directly accept and store results of arithmetic logic operations from ALU 112 as values of the variables in selected ones of the cache locations. The direct supplying as well as the direct accepting and storing are performed responsive to instructions 114 specifying the arithmetic/logic operations and logically designating the variables associated with the specified arithmetic/logic operations. In other words, the instructions are executed directly using the values of the designated variables stored in cache memory 102, and unlike the prior art, neither a stack, an accumulator, nor a register file is employed.

Before describing the present invention in further detail, it should be noted that while for ease of understanding, control unit 108 and mapping unit 110 are shown as two separate units, from the descriptions to follow, those skilled in the art will appreciate that the present invention may be practiced with control unit 108 and mapping unit 110 implemented as one or more units. Also, while two read ports and one write port are provided to cache memory 102, and only one ALU 112 is shown, the present invention may also be practiced with one or more read/write ports as well as multiple ALU 112. Furthermore, processor 100 may take the form of a functional block of a larger integrated circuit (chip), a single chip or multiple chips.

As shown, each instruction 114 comprises opcode 116 and one or more logical variable designations 118. Opcode 116 specifies the operation to be performed. For the illustrated embodiment, the operation may be a variable definition operation, an arithmetic or logic operation, or a variable assignment operation, to be explained more fully below. Logical variable designations 118 specify the variables associated with the specified operation. Note that logical variable designations 118 designate the variables, not the registers containing the variables, nor the physical/virtual addresses of the memory locations containing the variables. For some operations, a constant (also referred to as an immediate) may be specified in lieu of a logical variable designation.

In the case of the variable definition operation (DEFVAR), the physical/virtual address of the memory location of the variable being defined is specified. Hereinafter, the physical/virtual address of the memory location of the variable will simply be referred to as the memory address of the variable. The memory address may be explicitly specified, e.g. DEFVAR V1, 1000H, or implicitly specified employing an arithmetic expression, e.g. DEFVAR V1, (V2+V3), meaning the memory address of variable V1 is 1000H in the first case, and given by the sum of variables V2 and V3 in the second case. For the illustrated embodiment, the arithmetic expression may also employ the memory address of a variable, symbolically specified, e.g. DEFVAR V1, (@V2+V3), meaning the memory address of variable V1 is given by the adding the value of variable V3 to the memory address of variable V2.

Additionally, for the illustrated embodiment, a variable definition may also specify whether the value of the variable is to be "locked down" in the cache memory to facilitate positional access using the cache address of the storing cache location, and an initial value for the variable being defined, e.g. DEFVAR V1, 1000H, L, 1234, meaning the memory address of variable V1 is 1000H, and furthermore the value of variable V1 is to be "locked down" in cache memory 102, starting with the initial value of 1234. Preferably, all variables of an application are "locked down" in cache memory 102 and retrieved through positional addressing of cache memory 102. However, depending on the size of cache memory 102 employed in a particular implementation, as well as the number and size of the variables involved in an application, one may selectively "lock down" only the variables that are frequently needed. Values of the variables haven't been "locked down" are retrieved by content addressing cache memory 102. The manner in which control unit 108 and mapping unit 110 operate cache memory 102 to execute these variable definition operations will be described in more detail below.

Similarly, for the illustrated embodiment, symbolically specified memory address of a variable may be employed in arithmetic/logic operations and assignment operations. An example of an arithmetic/logic operation employing symbolically specified physical address of a variable is MAC (@V2+V3), K, meaning multiplying the constant K to the variable whose memory address is given by the sum of the memory address of variable V2 and the value of variable V3, and accumulate the product in the given memory address. Note that by forming a loop with the above described MAC statement and a DEFVAR V2, @V2+V3, the operation of multiplying and accumulating the constant K with variable V2 of an array (accessed with stride size V3) is compactly specified. Examples of assignment operations employing symbolically specified memory address of a variable are a=@b, a=*b, *a=b, *a=@b, *a=*b, @a=b, @a=@b, and @a=*b. In the first case, a=@b means assign the memory address of variable b to variable a, whereas in the second case, a=*b means assign the data of a variable whose memory address is given by the value stored in variable b to variable a. In the third case, *a=b means assign the value of b to a variable whose memory address is given by the value of variable a. In the fourth case, *a=@b means assign the memory address of variable b to a variable whose memory address is given by the value of variable a. In the fifth case, *a=*b means assign the value of a variable whose memory address is given by the value of variable b to a variable whose memory address is given by the value of variable a. In the sixth case, @a=b means assign the value of variable b as the memory address of variable a. In the seventh case, @a=@b means change the memory address of variable a to be the memory address of variable b. Last but not least, in the eighth case, @a=*b means assign the value of a variable whose address is given by variable b to be the memory address of variable a. The manner in which control unit 108 and mapping unit 110 operate cache memory i02 to execute these arithmetic/logic and assignment operations will be described in more detail below.

Continuing to refer to FIG. 1, for the illustrated embodiment, mapping unit 110 operates to map logical variable designations of the instructions to memory addresses of the variables as well as cache addresses to facilitate either content address or positionally address cache memory 102 to directly supply stored variable values as well as directly accept and store results of arithmetic/logic operations. More specifically, mapping unit 110 performs the mapping employing logical variable designation to address mappings created by control unit 108 responsive to instructions logically defining variables and specifying the memory addresses of the variables being defined, and subsequently maintained responsive to the various data movement resulted from the instruction execution.

Figure 2:
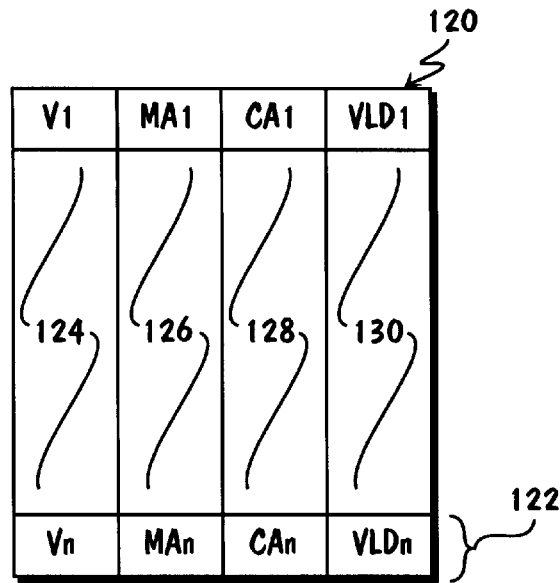
FIG. 2 illustrates one embodiment of logical variable designation to address mapping.

FIG. 2 illustrates one embodiment of the logical variable designation to address mappings created and maintained. As shown, for the illustrated embodiment, logical variable designation to address mappings 122 are maintained in mapping table 120. Each logical variable designation to address mapping 122 includes logical variable designation 124, memory address 126 of the designated variable, cache address 128 of the cache location where the designated variable is stored, and valid bit 130 denoting whether cache address 128 is valid or not. Valid bit 130 is set to denote valid cache address when the cache location is allocated to the variable, and reset to denote invalid cache address if the cache location is reallocated to another variable. Mapping table 120 may be stored in storage medium internal or external to mapping unit 110. Other data structure/organization and/or disposition may be employed. For example, in an alternate embodiment, cache address 128 and valid bit 130 are not maintained as part of each logical variable designation to address mapping 122. The values of the logical variable are retrieved through content addressing. In yet another alternate embodiment, memory address 126 of the designated variable is not maintained as part of each logical variable designation to address mapping 122. Memory address 126 is retrieved from tag array 104 using cache address 128.

Referring back to FIG. 1, in response to a basic variable definition operation where the physical address of the variable being defined is explicitly specified, control unit 108 causes mapping unit 110 to create the appropriate logical variable designation to address mapping employing the memory address explicitly specified, and then output the mapped memory address to content address cache memory 102 to cause a cache location to allocated for the variable being defined. The cache allocation is handled in the conventional manner, meaning if the allocation results in a cache miss, the value stored in the memory location is accessed and brought into the allocated cache location.

In response to a variable definition operation where the memory address of the variable being defined is implicitly specified, control unit 108 first operates cache memory 102 to output the stored values for the variables employed in the arithmetic expression, using either the mapped memory addresses or the cache addresses of the variables output by mapping unit 110 to content address or positionally address cache memory 102, and then causes mapping unit 110 to create the appropriate logical variable designation to address mapping employing the result of the arithmetic operation, as well as output the mapped memory address to cache memory 102 to allocate a cache location for the variable being defined as described earlier. If the arithmetic operation employs a symbolically specified memory address of a variable, control unit 108 further causes the mapped memory address output by mapping unit 110 to be by-passed to ALU 112.

If the value of the variable being defined is to be "locked down" in cache memory 102, control unit 108 further operates to cause the "lock down" bit of the corresponding cache tag entry to be set, "locking down" the storing cache line, and cause the cache address of the allocated cache location to be included in the logical variable designation to address mapping, and the associated valid bit be set. For the illustrated embodiment, a storing cache line is "locked down" by removing the cache line from being considered for reallocation. Other approaches may be employed. If the variable being defined is also supposed to be initialized to a specified initial value, control unit 108 further operates to cause the initial immediate value to be stored into the allocated cache location, overwriting the value brought in from memory.

As in conventional cache memory operation, if a content address access results in a cache miss, when evaluating an arithmetic expression for a logical variable definition operation, the required data is fetched from memory and loaded into cache memory 110, victimizing an existing cache line if necessary. Note that it is not possible to have a cache miss if the variable is positionally addressed, as a variable is positionally accessed only if it has been "locked down" in cache memory. Note that employment of the above described DEFVAR operation substantially eliminates the need for the LOAD instruction. For the illustrated embodiment, cache memory 102 is a write back cache, meaning "dirty" data stored in a cache line are written back into memory when the cache line is re-allocated. Note that by employing a write back cache, the instruction set of processor 100 needs not include a STORE instruction. Data are automatically stored into memory as an integral part of the cache line reallocation process.

In response to an instruction specifying an arithmetic or logic operation, control unit 108 in conjunction with mapping unit 110 operate cache memory 102 in like manner as described earlier for the variable definition operation where the memory address of a variable being defined is implicitly defined employing an arithmetic expression, except the result output by ALU 112 is stored in a cache location in accordance with the mapped memory address or cache address of the destination variable output by mapping unit 110 instead. Again, as described earlier, in each case, if the value of a variable is accessed via content address, i.e. the variable value is not "locked down" in cache memory 102, and the memory address is currently not cached in cache memory 102, a cache miss is resulted. The cache miss is handled in a conventional manner.

In response to a basic assignment operation, i.e. a=b, control unit 108 in conjunction with mapping unit 110 operate cache memory 102 to first output the value stored for variable b, using either the mapped memory address or cache address of variable b output by mapping unit 110, and then store the value output for variable b in the cache location specified by the mapped memory address or cache address of variable a output by mapping unit 110. In response to the a=@b assignment instruction, control unit 108 and mapping unit 110 operate cache memory 102 to store the mapped memory address of variable b output by mapping unit 110 as the value of variable a in a cache location specified by the mapped memory address or cache address of the variable a output by mapping unit 110. In response to the a=*b assignment operation, control unit 108 and mapping unit 110 operate cache memory 102 to first output the stored value of variable b from a first cache location using the mapped memory address or cache address of variable b output by mapping unit 110, then output the stored value of another variable from another cache location using the first output as the memory address of the other variable, and then store the second output as value of variable a in a cache location specified by the mapped memory address or cache address of variable a output by mapping unit 110.

In response to the *a=b assignment operation, control unit 108 and mapping unit 110 operate cache memory 102 to first output the stored values of variables a and b stored in a first and a second cache location using the mapped memory addresses or cache addresses of variables a and b output by mapping unit 110, and then store the output value of the variable b as value of another variable in a cache location specified by the output value of the variable a as the memory address of the other variable. In response to the *a=@b assignment operation, control unit 108 and mapping unit 110 operate cache memory 102 to output the value of variable a using the mapped memory address or cache address output by mapping unit 110, and then store the memory address of variable b output by mapping unit 110 as value of the variable whose address is given by the value of variable a. In response to the *a=*b assignment operation, control unit 108 and mapping unit 110 operate cache memory 102 to output the values of variables a and b using the mapped memory addresses or cache addresses output by mapping unit 110, and then store the value of a first variable whose address is given by the value of variable b as value of a second variable whose address is given by the value of variable a.

In response to the @a=b assignment operation, control unit 108 and mapping unit 110 operate cache memory 102 to first output the stored values of variables a and b from a first and a second cache location using the mapped memory addresses or cache addresses of variables a and b output by mapping unit 110, then store the output value of variable a as value of another variable using the output value of variable b as the memory address of the other variable. In response to the @a=@b assignment operation, control unit 108 and mapping unit 110 operate cache memory 102 to first output the stored value of variable a from a cache location using the mapped memory address or cache address of variable a output by mapping unit 110, then store the output value of variable a as value of another variable using the memory address of variable b. In response to the @a=*b assignment operation, control unit 108 and mapping unit 110 operate cache memory 102 to first output the stored values of variables a and b from a first and a second cache location using the mapped memory addresses or cache addresses of variables a and b output by mapping unit 110, then output the value of a first other variable whose address is given by the value of variable b and store the output value of variable a as value of a second other variable using the output value of the first other variable as the memory address of the second other variable.

In each of these last three cases, control unit 108 further operates mapping unit 110 to update the logical variable designation to address mapping for variable a to map variable a to the memory address of the "last" other variable. In each of these eight cases, if the memory address is currently not cached in cache memory 102 whenever cache memory 102 is content addressed, a cache miss is resulted. The cache miss is handled in a conventional manner.

Those skilled in the art will appreciate that the above described cache memory based instruction execution overcomes in particular the working set limitation commonly encountered in register based processors. The above described operations employing both symbolically specified memory addresses as well as data variables also provide significant advantages over prior art instructions.

Figure 3:
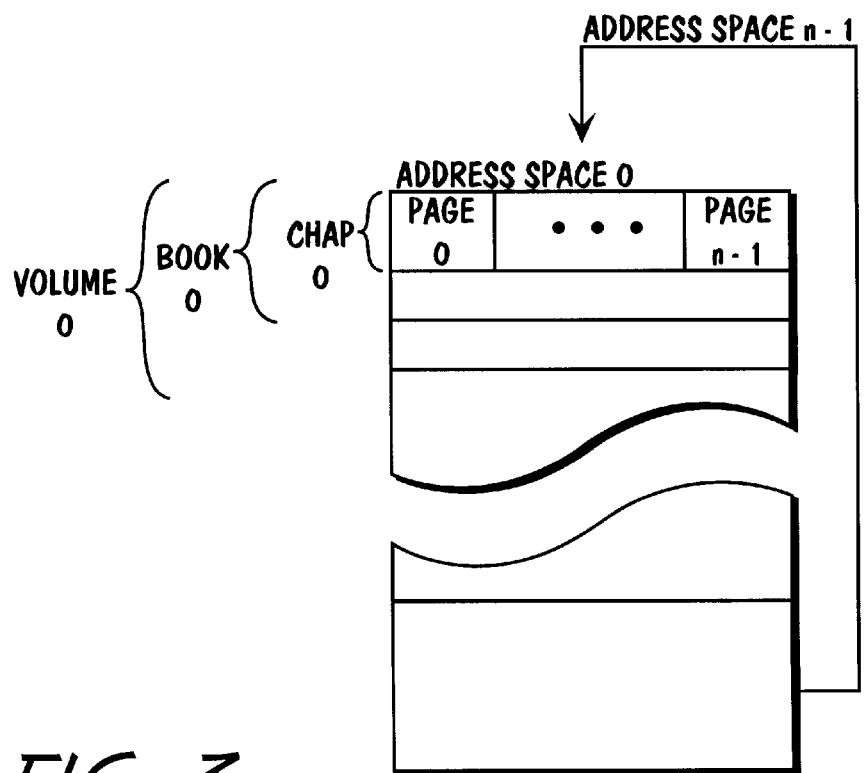
FIG. 3 illustrates one embodiment of memory space organization.

FIG. 3 illustrates one embodiment of the memory space organization for exemplary processor 100. As shown, for the illustrated embodiment, the memory space is organized into an hierarchy of logical units. Specifically, for the illustrated embodiment, the memory space is divided into multiple address spaces, with each address space further divided into volumes, and each volume divided into books. Each book is in turn divided into chapters, with each chapter divided into pages. For the illustrated embodiment, the first page of each address space is reserved for storing control variables of exemplary processor 100. In other words, exemplary processor 100 neither employs a general purpose register file nor control registers. In one embodiment, the earlier described mapping table 120 is also stored in this reserved memory page. Control unit 108 and mapping unit 110 operate cache memory 102 to allocate the cache lines to different memory pages. In other words, control variables are cached in cache memory 102, and may be accessed and manipulated by instructions as described earlier for data variables. In other embodiments, other memory page(s) may be reserved for the control variables instead.

In one embodiment, control unit 108 and mapping unit 110 can also operate cache memory 102 to execute instructions, utilizing cache memory 102 to implement a virtual register file. In other words, in addition to the above described manner of executing instructions, where inputs and outputs of arithmetic/logic operations are specified using logical variable designations, control unit 108 and mapping unit 110 can also operate cache memory 102 to execute instructions, where inputs and outputs of arithmetic/logic operations are specified in the conventional manner, that is in terms of the registers and/or memory locations holding the operands. Operating cache memory 102 to implement a virtual register file to execute instructions in such a manner is the subject matter of the co-pending application, entitled Virtual Register File, filed contemporaneously, and having common inventorship as well as assignee as the present application. The copending application is hereby fully incorporated by reference.

While the present invention has been described in terms of the above described embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

Thus, a cache memory based approach to executing instructions has been disclosed.

What is claimed is:

1. An apparatus comprising:

cache memory having a plurality of cache lines of cache locations; and one or more control units coupled to said cache memory that operate the cache memory to directly supply appropriate ones of a plurality of values stored in selected ones of said cache locations for a plurality of variables to one or more arithmetic logic units (ALU) as inputs to arithmetic/logic operations, and/or to directly accept and store results of arithmetic logic operations from the one or more ALU as values of the variables in selected ones of said cache locations, responsive to instructions specifying said arithmetic/logic operations and logically designating the variables associated with the specified arithmetic/logic operations, wherein said cache lines include data lines and corresponding tag entries to the data lines, said one or more control units further operate the cache memory to store a plurality of address tags in said tag entries for the variables whose values are stored in the corresponding data lines, the address tags being associated with memory addresses of the variables, and each of said tag entries further includes a control bit to be employed to effectuate locking down the cache line.

2. The apparatus as set forth in claim 1, wherein said one or more control units operate to map logical variable designations of the instructions to at least one of memory addresses of the variables and cache addresses of cache locations employed to store the variables, to at least one of content address and positionally address said cache memory to facilitate said direct supplying of stored variable values and said direct acceptance and storing of results of arithmetic/logic operations.

3. The apparatus as set forth in claim 2, wherein said one or more control units further operate to maintain logical variable designation to address mappings, creating and updating logical variable designation to address mappings responsive to instructions logically defining variables and specifying memory addresses of the variables being defined.

4. The apparatus as set forth in claim 3, wherein the one or more control units further operate the cache memory to allocate a cache line, and store the value of a logical variable being defined into an appropriate one of the cache locations of the allocated cache line, whenever a logical variable designation to address mapping is created for a logical variable being defined, if the value of the logical variable being defined is not already stored in the cache memory.

5. The apparatus as set forth in claim 4, wherein the one or more control units further operate the cache memory to conditionally write back the current content of the cache line being allocated as appropriate, if the cache line being allocated is currently allocated and storing values of other logical variables.

6. The apparatus as set forth in claim 3, wherein the memory address of at least one of the variables being defined is either explicitly specified or implicitly specified in terms of an arithmetic expression of one or more logically designated variables.

7. The apparatus as set forth in claim 6, wherein for each variable whose memory address is implicitly specified in terms of an arithmetic expression of one or more logically designated variables, the one or more control units first operating the cache memory to supply the stored values of the one or more logically designated variables to the one or more ALU using the mapped addresses of the logically designated variables, then operating to create or update an appropriate one of the logical variable designation to address mapping using the result of the arithmetic expression.

8. The apparatus as set forth in claim 7, wherein the arithmetic expression includes employment of the memory address of at least one of the one or more logically designated variables, symbolically specified, the one or more control units further operate to effectuate provision of the mapped memory address of each of the at least one of the one or more logically designated variables to the one or more ALU.

9. The apparatus as set forth in claim 2, wherein said one or more control units include a mapping unit that operates to perform said maintenance of logical variable designation to address mappings and said mapping of logical variable designations to at least one of memory addresses of the variables and cache addresses of cache locations employed to store the variables.

10. The apparatus as set forth in claim 1, wherein at least one of the specified arithmetic/logic operation employs the memory address of a logically designated variable, symbolically specified, the one or more control units further operate to provide the mapped memory address of the logically designated variable to the one or more ALU.

11. The apparatus as set forth in claim 1, wherein the one or more control units further operate the cache memory to directly execute assignment instructions logically designating the variables associated with the assignments.

12. The apparatus as set forth in claim 11, wherein at least one of assignment instructions include employment of at least one of an implicitly designated variable and the memory address of at least one of the logically designated variable, symbolically specified.

13. The apparatus as set forth in claim 12, wherein the one or more control units operate the cache memory to store the mapped memory address of a first variable (b) into a first cache location as the value of a second variable (a) using one of the mapped memory and cache addresses of the second variable (a), responsive to an instruction so specifying, employing only a symbolic designation for the memory address of the first variable (b).

14. The apparatus as set forth in claim 12, wherein the one or more control units further operate the cache memory to first output the stored value of a first variable (b) from a first cache location using one of the mapped memory and cache addresses of the first variable (b), then output the stored value of a second variable from a second cache location using the first output as the memory address of the second variable, and then store the second output in a third cache location as value of a third variable (a) using one of the mapped memory and cache addresses of the third variable (a), responsive to an instruction so specifying employing an implicit designation for the second variable.

15. The apparatus as set forth in claim 12, wherein the one or more control units further operate said cache memory to first output the stored values of a first and a second variable (a and b) stored in a first and a second cache location using one of the mapped memory and cache addresses of each of the first and second variables (a and b), and then store the output value of the second variable (b) in a third cache location as value of a third variable using the output value of the first variable (a) as the memory address of the third variable, responsive to an instruction so specifying employing an implicit designation for the third variable.

16. The apparatus as set forth in claim 12, wherein the one or more control units further operate said cache memory to first output the stored values of a first variable (a) from a first cache location using one of the mapped memory and cache addresses of the first variable (a), then store the memory address of a second variable (b) into a second cache location as value of a third variable using the output value of the first variable as the memory address of the third variable, responsive to an instruction so specifying employing an implicit designation for the third variable and a symbolic designation of the memory address of the second variable.

17. The apparatus as set forth in claim 12, wherein the one or more control units further operate said cache memory to first output the stored values of a first and a second variable (a and b) from a first and a second cache location using one of the mapped memory and cache addresses of each of the first and second variables (a and b), then store the value of a third variable whose memory address is given by the output value of the second variable (b) into a third cache location as value of a fourth variable using the output value of the first variable as the memory address of the fourth variable, responsive to an instruction so specifying employing an implicit designation for each of the third and fourth variables.

18. The apparatus as set forth in claim 12, wherein the one or more control units further operate said cache memory to first output the stored values of a first and a second variable (a and b) from a first and a second cache location using one of the mapped memory and cache addresses of each of the first and second variables (a and b), then store the output value of the first variable into a third cache location as value of the first variable using the output value of the second variable as the memory address of the first variable, responsive to an instruction so specifying employing a symbolic designation for the memory address of the first variable.

19. The apparatus as set forth in claim 12, wherein the one or more control units further operate said cache memory to first output the stored value of a first variable (a) from a first cache location using one of the mapped memory and cache addresses of the first variable (a), then store the output value of the first variable into a second cache location as value of the first and a second variable using the memory address of the second variable (b) as the memory address of the first as well as the second variable, responsive to an instruction so specifying employing symbolic designations for the memory addresses of the first and second variables.

20. The apparatus as set forth in claim 12, wherein the one or more control units further operate said cache memory to first output the stored values of a first and a second variable (a and b) from a first and a second cache location using one of the mapped memory and cache addresses of the first and second variables (a and b), then output the stored value of a third variable from a third cache location using the output value of the second variable (b) as memory address of the third variable, and store the output value of the first variable into a fourth cache location as the value of the first variable using the output of the third variable as memory address of the first variable (a), responsive to an instruction so specifying employing symbolic designation for the memory address of the first variable and implicit designation for the third variable.

21. The apparatus as set forth in claim 12, wherein for selected ones of the assignment operations, the one or more control units further operate to update appropriate ones of the logical variable designation to address mappings.

22. The apparatus as set forth in claim 1, wherein the variables include control variables of the apparatus.

23. The apparatus as set forth in claim 22, wherein the one or more control units operate the control memory to allocate the plurality of cache lines of cache locations to store values of variables with memory addresses of a plurality of memory pages, with a first of the memory pages being reserved for said control variables of the apparatus.

24. The apparatus as set forth in claim 23, wherein the plurality of memory pages are organized into an hierarchy of logical units of at least two levels.

25. A method for executing instruction comprising the steps of:
  (a) directly supplying appropriate ones of a plurality of values stored in selected ones of a plurality of cache locations of a plurality of cache lines of a cache memory for a plurality of variables to one or more arithmetic logic units (ALU) as inputs to a plurality of arithmetic/logic operations, responsive to instructions specifying said arithmetic/logic operations, responsive to instructions specifying said arithmetic/logic operations and logically designating the variables associated with the specified arithmetic/logic operations;
  (b) directly accepting and storing results of the arithmetic logic operations from the one or more ALU as values of the variables in selected ones of said cache locations, responsive to said instructions; and
  (c) storing a plurality of address tags in a plurality of cache tag entries corresponding to data lines storing the variables, the address tags being associated with memory addresses of the variables, and setting control bits in selected ones of the plurality of address tags to effectuate locking down of the selected ones of the cache lines.

26. The method as set forth in claim 25, said method further comprises the step (c) mapping logical variable designations of the instructions to at least one of memory and cache addresses of the variables, and steps (a) and (b) selectively use the mapped memory and cache addresses to content and positionally address said cache memory to facilitate said direct supply of stored variable values and said direct acceptance and storing of results of arithmetic/logic operations.

27. The method as set forth in claim 26, wherein step (c) comprises maintaining logical variable designation to address mappings, creating and updating logical variable designation to address mappings responsive to instructions logically defining variables and specifying memory addresses of the variables being defined.

28. The method as set forth in claim 27, wherein step (c) further comprises allocating a cache line, and storing the value of a logical variable being defined into an appropriate one of the cache locations of the allocated cache line, whenever a logical variable designation to address mapping is created for a logical variable being defined, if the value of the logical variable being defined is not already stored in the cache memory.

29. The method as set forth in claim 28, wherein step (c) further comprises conditionally writing back the current content of the cache line being allocated as appropriate, if the cache line being allocated is currently allocated and storing values of other logical variables.

30. The method as set forth in claim 27, wherein the memory address of at least one of the variables being defined is explicitly specified.

31. The method as set forth in claim 27, wherein the memory address of at least one of the variables being defined is implicitly specified in terms of an arithmetic expression of one or more logically designated variables.

32. The method as set forth in claim 31, wherein step (c) further comprises, for each variable whose memory address is implicitly specified in terms of an arithmetic expression of one or more logically designated variables, supplying the stored values of the one or more logically designated variables to the one or more ALU using one of the mapped memory and cache addresses of the logically designated variables, then operating to create or update an appropriate one of the logical variable designation to address mapping using the result of the arithmetic expression.

33. The method as set forth in claim 32, wherein the arithmetic expression includes employment of at least one of implicitly specified variable and the memory address of a logically designated variable, symbolically specified, and step (c) further comprises providing the symbolically specified memory address of the logically designated variable to the one or more ALU.

34. The method as set forth in claim 26, wherein said step (c) is performed using a mapping unit.

35. The method as set forth in claim 25, wherein at least one of the specified arithmetic/logic operation employs at least one of implicitly specified variable and the memory address of a logically designated variable, symbolically specified, the one or more control units further operate to provide the symbolically specified memory address of the logically designated variable to the one or more ALU.

36. The method as set forth in claim 25, wherein the method further comprises step (c) directly effectuating by said cache memory execution of assignment instructions logically designating the variables associated with the assignments.

37. The method as set forth in claim 36, wherein at least one of the assignment instruction execution effectuated in step (c) include employment of at least one of implicitly specified variable and the memory address of at least one of the logically designated variable, symbolically specified.

38. The method as set forth in claim 37, wherein step (c) comprises storing the mapped memory address of a first variable (b) as the value of a second variable (a) in a first cache location using one of the mapped memory and cache addresses of the second variable (a), responsive to an instruction so specifying, employing only a symbolic designation for the memory address of the first variable (b).

39. The method as set forth in claim 37, wherein step (c) comprises first outputting the stored value of a first variable (b) from a first cache location using one of the mapped memory and cache addresses of the first variable (b), then outputting the stored value of a second variable from a second cache location using the first output as the memory address of the second variable, and then storing the second output as value of a third variable (a) in a third cache location using one of the mapped memory and cache addresses of the third variable (a), responsive to an instruction so specifying employing an implicit designation for the second variable.

40. The method as set forth in claim 37, wherein step (c) comprises first outputting the stored values of a first and a second variable (a and b) stored in a first and a second cache location using one of the mapped memory and cache addresses of each of the first and second variables (a and b), and then storing the output value of the second variable (b) as value of a third variable in a third cache location using the output value of the first variable (a) as the memory address of the third variable, responsive to an instruction so specifying employing an implicit designation for the third variable.

41. The method as set forth in claim 37, wherein step (c) comprises first outputting the stored values of a first variable (a) from a first cache location using one of the mapped memory and cache addresses of the first variable (a), and then storing the memory address of a second variable (b) into a second cache location as value of a third variable using the output value of the first variable as the memory address of the third variable, responsive to an instruction so specifying employing an implicit designation for the third variable and a symbolic designation of the memory address of the second variable.

42. The method as set forth in claim 37, wherein step (c) comprises first outputting the stored values of a first and a second variable (a and b) from a first and a second cache location using one of the mapped memory and cache addresses of each of the first and second variables (a and b), and then storing the value of a third variable whose memory address is given by the output value of the second variable (b) into a third cache location as value of a fourth variable using the output value of the first variable as the memory address of the fourth variable, responsive to an instruction so specifying employing an implicit designation for each of the third and fourth variables.

43. The method as set forth in claim 37, wherein step (c) comprises first outputting the stored values of a first and a second variable (a and b) from a first and a second cache location using one of the mapped memory and cache addresses of the first and second variables (a and b), and then storing the output value of the first variable into a third cache location as value of the first variable using the output value of the second variable as the memory address of the first variable, responsive to an instruction so specifying employing a symbolic designation for the memory address of the first variable.

44. The method as set forth in claim 37, wherein step (c) comprises first outputting the stored value of a first variable (a) from a first cache location using one of the mapped memory and cache addresses of the first variable (a), and then storing the output value of the first variable into a second cache location as value of the first and a second variable using the memory address of the second variable (b) as the memory address of the first as well as the second variable, responsive to an instruction so specifying employing symbolic designations for the memory addresses of the first and second variables.

45. The method as set forth in claim 37, wherein step (c) comprises first outputting the stored values of a first and a second variable (a and b) from a first and a cache location using one of the mapped memory and cache addresses of each of the first and second variables (a and b), then outputting the stored value of a third variable from a third cache location using the output value of the second variable (b) as memory address of the third variable, and storing the output value of the first variable into a fourth cache location as the value of the first variable using the output of the third variable as memory address of the first variable (a), responsive to an instruction so specifying employing symbolic designation for the memory address of the first variable and implicit designation for the third variable.

46. The method as set forth in claim 37, wherein step (c) further comprises updating appropriate ones of logical variable designation to address mappings for selected ones of the assignment operations.

47. The method as set forth in claim 25, wherein the variables include control variables.

48. The method as set forth in claim 47, wherein the method further comprises the step (c) allocating the plurality of cache lines of cache locations to store values of variables with memory addresses of a plurality of memory pages, with a first of the memory pages being reserved for said control variables.

49. The method as set forth in claim 48, wherein the plurality of memory pages are organized into an hierarchy of logical units of at least two levels.

* * * * *